US012108271B2

(12) United States Patent
Bao et al.

(10) Patent No.: US 12,108,271 B2
(45) Date of Patent: Oct. 1, 2024

(54) MEASUREMENT REPORT FOR SIDELINK-ASSISTED POSITIONING

(71) Applicant: QUALCOMM Incorporated, San Diego, CA (US)

(72) Inventors: Jingchao Bao, San Diego, CA (US); Sony Akkarakaran, Poway, CA (US); Tao Luo, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 284 days.

(21) Appl. No.: 17/463,231

(22) Filed: Aug. 31, 2021

(65) Prior Publication Data

US 2022/0070712 A1  Mar. 3, 2022

Related U.S. Application Data

(60) Provisional application No. 63/073,851, filed on Sep. 2, 2020.

(51) Int. Cl.
*G01S 5/02* (2010.01)
*H04W 24/10* (2009.01)
(52) U.S. Cl.
CPC .................................. *H04W 24/10* (2013.01)
(58) Field of Classification Search
CPC . G01S 5/0036; G01S 5/08; G01S 5/10; G01S 5/02; G01S 5/0244; G01S 5/0027; G01S 5/021; H04W 64/00; H04W 24/10
USPC ......................................................... 370/252
See application file for complete search history.

(56) References Cited

U.S. PATENT DOCUMENTS

| 9,998,856 | B2 * | 6/2018 | Edge ....................... G01S 19/09 |
| 2004/0120386 | A1 * | 6/2004 | Grilli ........................ G01S 5/10 375/148 |
| 2016/0028448 | A1 * | 1/2016 | Park ......................... H04B 7/26 375/267 |
| 2016/0095080 | A1 * | 3/2016 | Khoryaev ............. G01S 5/0284 455/456.1 |
| 2016/0295374 | A1 * | 10/2016 | Persson ..................... G01S 5/06 |
| 2018/0220263 | A1 * | 8/2018 | Jiang ..................... G01S 13/825 |
| 2019/0297673 | A1 * | 9/2019 | Xue ......................... H04W 4/70 |

(Continued)

OTHER PUBLICATIONS

Institute for Information Industry (III): "Enhanced OTDOA positioning algorithm with legacy UE support", 3GPP Draft; R1-153151_Enhanced OTDOA Positioning Algorithm With Legacy UE Support_Final, 3RD Generation Partnership Project (3GPP), Mobile Competence Centre; 650, Route Des Lucioles; F-06921 Sophia (Year: 2015).*

(Continued)

*Primary Examiner* — Edan Orgad
*Assistant Examiner* — Vanneilian Lalchinthang
(74) *Attorney, Agent, or Firm* — Thien T. Nguyen

(57) ABSTRACT

According to embodiments herein, the use of an SL interface in the positioning of a UE can include additional reporting from the UE or an anchor UE related to a reference signal sent via the SL interface. This information can include information regarding the received power and/or timing of the reference signal, the angle at which it was received, and orientation of a receiving UE, and various other considerations that may not be needed in a Uu interface with a base station.

29 Claims, 11 Drawing Sheets

(56) References Cited

U.S. PATENT DOCUMENTS

2021/0051500 A1* 2/2021 Chae .................. H04L 5/0048
2022/0191936 A1* 6/2022 Shin ................ H04W 74/0833
2023/0184875 A1* 6/2023 Berggren ............. G01S 5/0027
455/456.2

OTHER PUBLICATIONS

International Search Report and Written Opinion—PCT/US2021/048616—ISA/EPO—Dec. 6, 2021.

3GPP TS 37.355: "3rd Generation Partnership Project; Technical Specification Group Radio Access Network; LTE Positioning Protocol (LPP) (Release 16)", 3GPP TS 37.355, 3rd Generation Partnership Project, Mobile Competence Centre, 650, Route Des Lucioles, F-06921 Sophia-Antipolis Cedex, France, No. V16.1.0, Jul. 24, 2020 (Jul. 24, 2020), 292 pages, XP051925824, Chapters 4.1.3, 6.5.1.2, Sections 5-5.3.4 and 6.4.2-6.4.3, p. 13, paragraph 1 Scope-page 104, paragraph 6.5.1.9 OTDOA Error Elements.

Institute for Information Industry (III): "Enhanced OTDOA Positioning Algorithm with Legacy UE Support", 3GPP TSG RAN WG1 Meeting #81, R1-153151, 3rd Generation Partnership Project, Mobile Competence Centre, 650 Route Des Lucioles, F-06921 Sophia, vol. RAN WG1, No. Fukuoka, May 25, 2015-May 29, 2015, May 24, 2015, XP050971285, 3 Pages, chapters 1, 2, figures 1, 2.

* cited by examiner

MEASUREMENT REPORT FOR SIDELINK-ASSISTED POSITIONING

RELATED APPLICATIONS

This application claims the benefit of U.S. Provisional Application No. 63/073,851, filed Sep. 2, 2020, entitled "MEASUREMENT REPORT FOR SIDELINK-ASSISTED POSITIONING", which is assigned to the assignee hereof, and incorporated herein in its entirety by reference.

BACKGROUND

1. Field of Invention

The present invention relates generally to the field of wireless communications, and more specifically to determining the location of a User Equipment (UE) using radio frequency (RF) signals.

2. Description of Related Art

The use of a sidelink (SL) interface in the positioning of a UE for which a position is to be determined (or "target UE") may be similar in ways to the use of base stations. However, specific details information provided via the SL interface, assistance data, and the measurement report for positioning using the SL interface are yet undetermined. There are no definitions for SL-based assisted measurements in Long-Term Evolution (LTE) Positioning Protocol (LPP) reporting.

BRIEF SUMMARY

According to embodiments herein, the use of an SL interface in the positioning of a target UE can include additional reporting from the target UE or an anchor UE related to a reference signal sent via the SL interface. This information can include information regarding the received power and/or timing of the reference signal, the angle at which it was received, and orientation of a receiving UE, and various other considerations that may not be needed in a Uu interface with a base station.

An example method of providing a positioning measurement report for determining a location of a first user equipment (UE), according to this disclosure, may comprise obtaining a first measurement, with the first UE, of a first reference signal sent via a sidelink (SL) interface between the first UE and a second UE. The method also may comprise obtaining a second measurement, with the first UE, of a second reference signal transmitted by a base station, wherein the first measurement and the second measurement are obtained within a predetermined time window. The method also may comprise sending, with the first UE, information indicative of the first measurement and information indicative of the second measurement.

An example first UE for providing a positioning measurement report for determining a location of a first user equipment (UE), according to this disclosure, may comprise a transceiver, a memory, one or more processors communicatively coupled with the transceiver and the memory, wherein the one or more processors are configured to obtain a first measurement, using the transceiver, of a first reference signal sent via a sidelink (SL) interface between the first UE and a second UE. The one or more processors further may be configured to obtain a second measurement, using the transceiver, of a second reference signal transmitted by a base station, wherein the first measurement and the second measurement are obtained within a predetermined time window. The one or more processors further may be configured to send, using the transceiver, information indicative of the first measurement and information indicative of the second measurement.

An example apparatus for providing a positioning measurement report for determining a location of a first user equipment (UE), according to this disclosure, may comprise means for obtaining a first measurement, at the first UE, of a first reference signal sent via a sidelink (SL) interface between the first UE and a second UE. The apparatus further may comprise means for obtaining a second measurement, at the first UE, of a second reference signal transmitted by a base station, wherein the first measurement and the second measurement are obtained within a predetermined time window. The apparatus further may comprise means for sending information indicative of the first measurement and information indicative of the second measurement.

According to this disclosure, an example non-transitory computer-readable medium stores instructions for providing a positioning measurement report for determining a location of a first user equipment (UE), the instructions comprising code for obtaining a first measurement, with the first UE, of a first reference signal sent via a sidelink (SL) interface between the first UE and a second UE. The instructions further may comprise code for obtaining a second measurement, with the first UE, of a second reference signal transmitted by a base station, wherein the first measurement and the second measurement are obtained within a predetermined time window. The instructions further may comprise code for sending, with the first UE, information indicative of the first measurement and information indicative of the second measurement.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
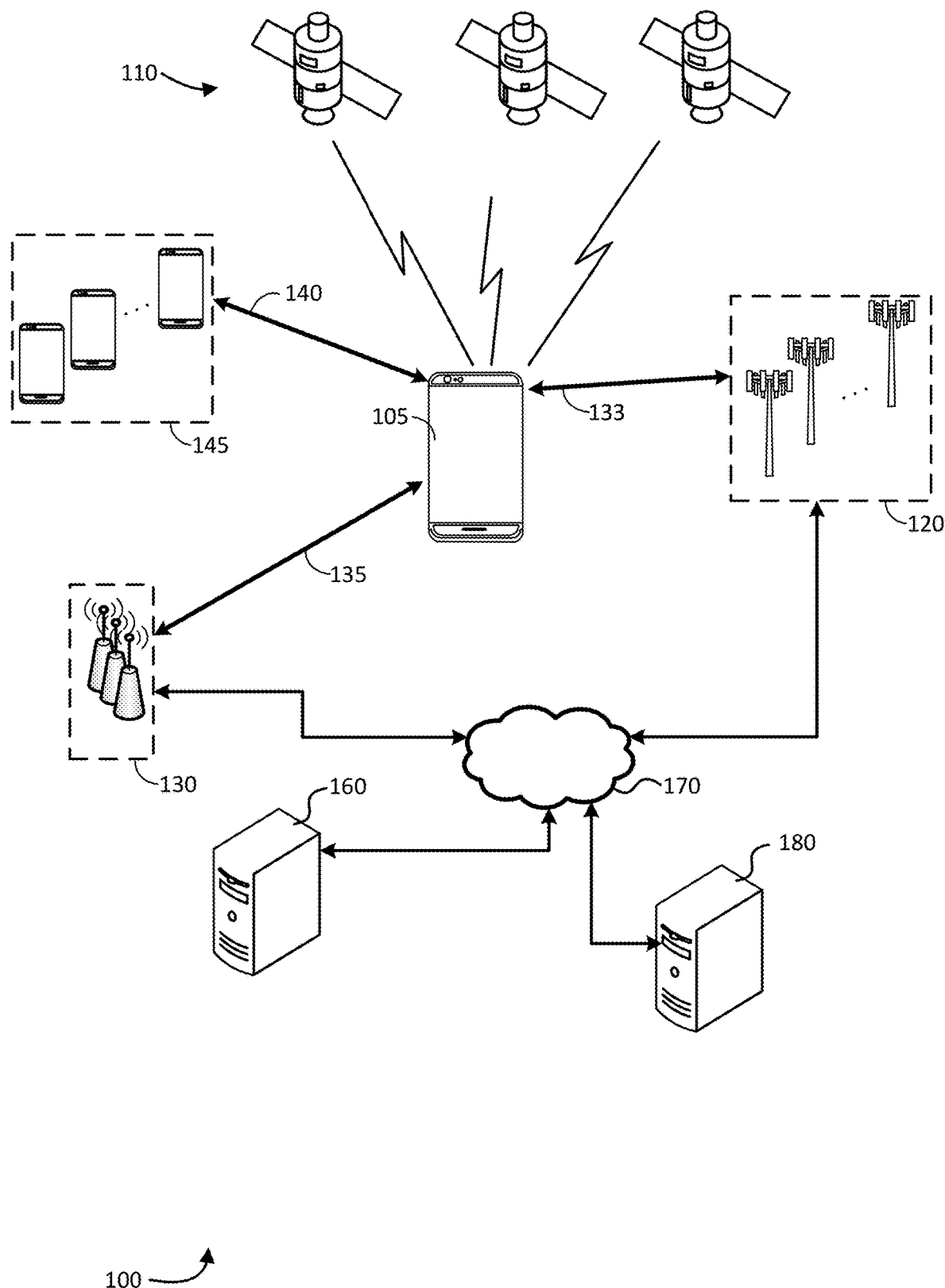
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. While some embodiments in which one or more aspects of the disclosure may be implemented as described below, other embodiments may be used, and various modifications may be made without departing from the scope of the disclosure.

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. Additionally, references to "reference signals," "positioning reference signals," "reference signals for positioning," and the like may be used to refer to signals used for positioning of a user equipment (UE). As described in more detail herein, such signals may comprise any of a variety of signal types but may not necessarily be limited to a Positioning Reference Signal (PRS) as defined in relevant wireless standards.

FIG. 1 is a simplified illustration of a positioning system 100 in which a UE 105, location server 160, and/or other components of the positioning system 100 can use the techniques provided herein for determining and estimated location of UE 105, according to an embodiment. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 may be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP or an AP having cellular capabilities (e.g., 4G LTE and/or 5G NR), for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135, or via one or more other UEs 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other UEs 145, which may be mobile or fixed. When or more other UEs 145 are used in the position determination of a particular UE 105, the UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 105 may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location (including, e.g., the location of a base station 120 or AP 130) or some other location such as a location for UE 105 at some known previous time, or a location of another UE 145 at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, or child or pet location). Additionally or alternatively, the external client 180 may obtain and provide the location of UE 105 to an emergency services provider, government agency, etc.

Figure 2:
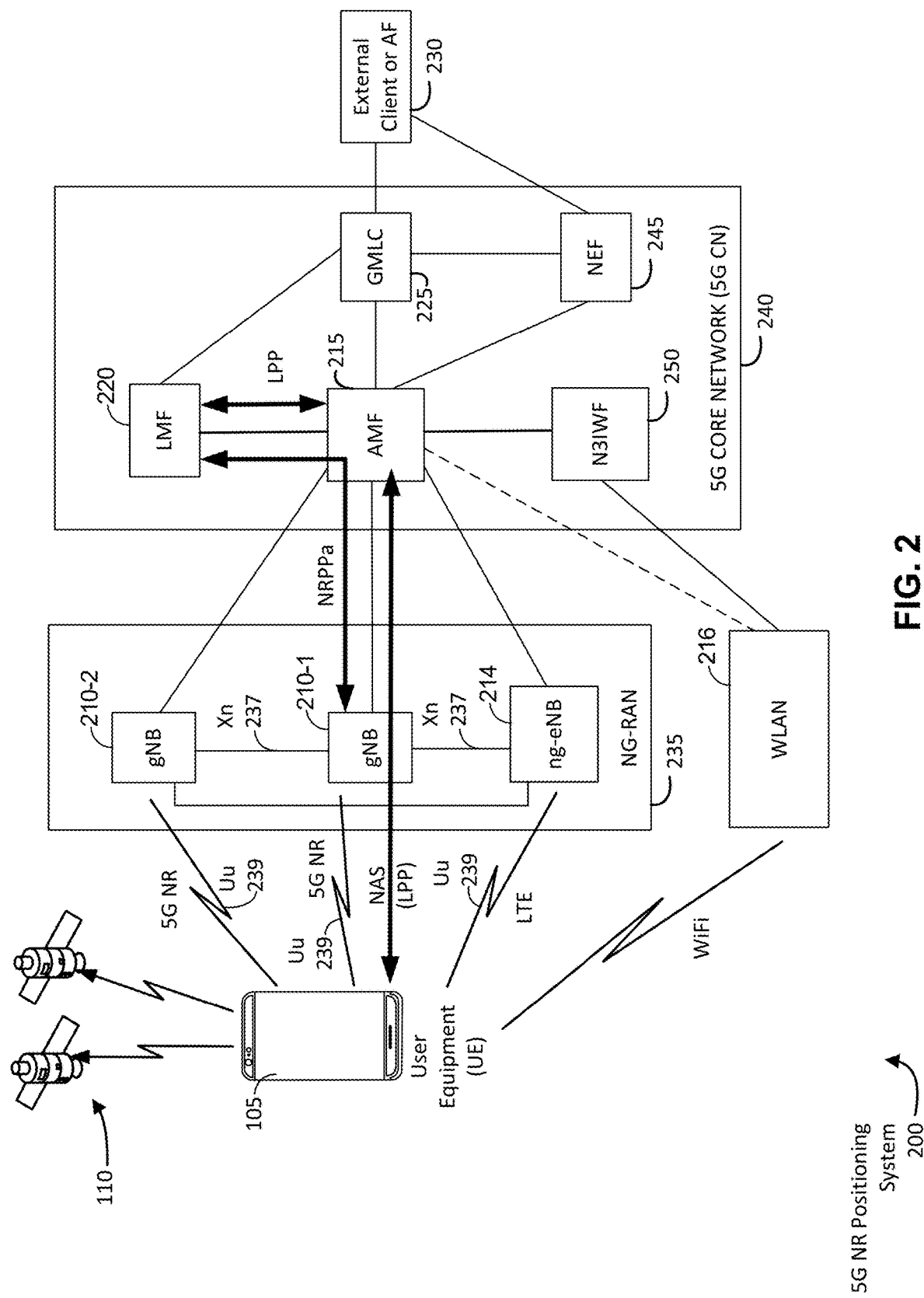
FIG. 2 is a diagram of a 5th Generation (5G) New Radio (NR) positioning system, illustrating an embodiment of a positioning system (e.g., the positioning system of FIG. 1) implemented within a 5G NR communication system.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes 210, 214, 216 (which may correspond with base stations 120 and access points 130 of FIG. 1) and (optionally) an LMF 220 (which may correspond with location server 160) to implement one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. The 5G NR positioning system 200 may further utilize information from GNSS satellites 110 from a GNSS system like Global Positioning System (GPS) or similar system (e.g. GLONASS, Galileo, Beidou, Indian Regional Navigational Satellite System (IRNSS)). Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include NR NodeB (gNB) 210-1 and 210-2 (collectively and generically referred to herein as gNBs 210). Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 105. It is noted that while only one ng-eNB 214 is shown in FIG. 2, some embodiments may include multiple ng-eNBs 214. Base stations 210, 214 may communicate directly with one another via an Xn communication interface. Additionally or alternatively, base stations 210, 214 may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node 210, 214, or 216 of a first RAT to an access node 210, 214, or 216 of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.445. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAOA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Figure 4:
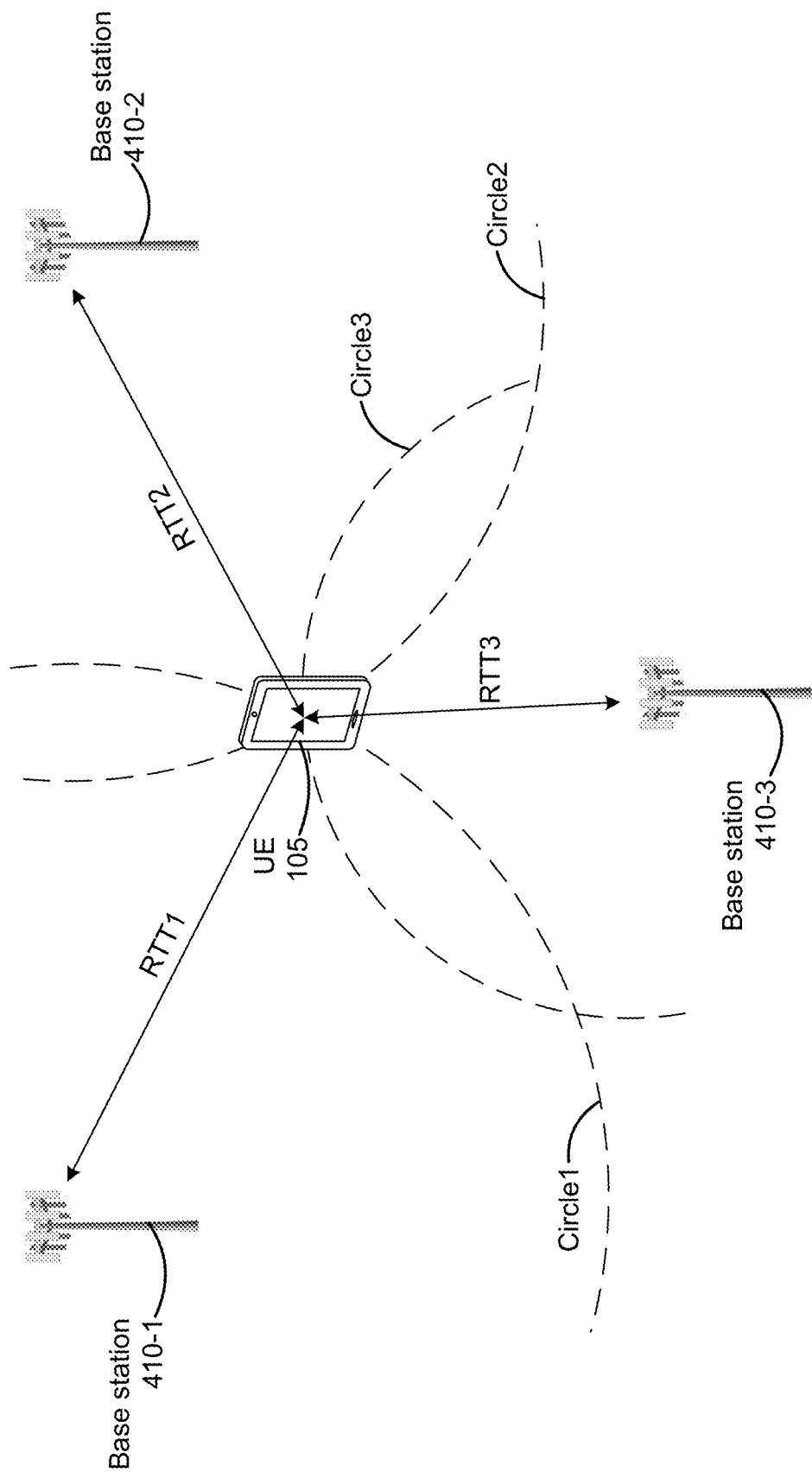
Figure 5:
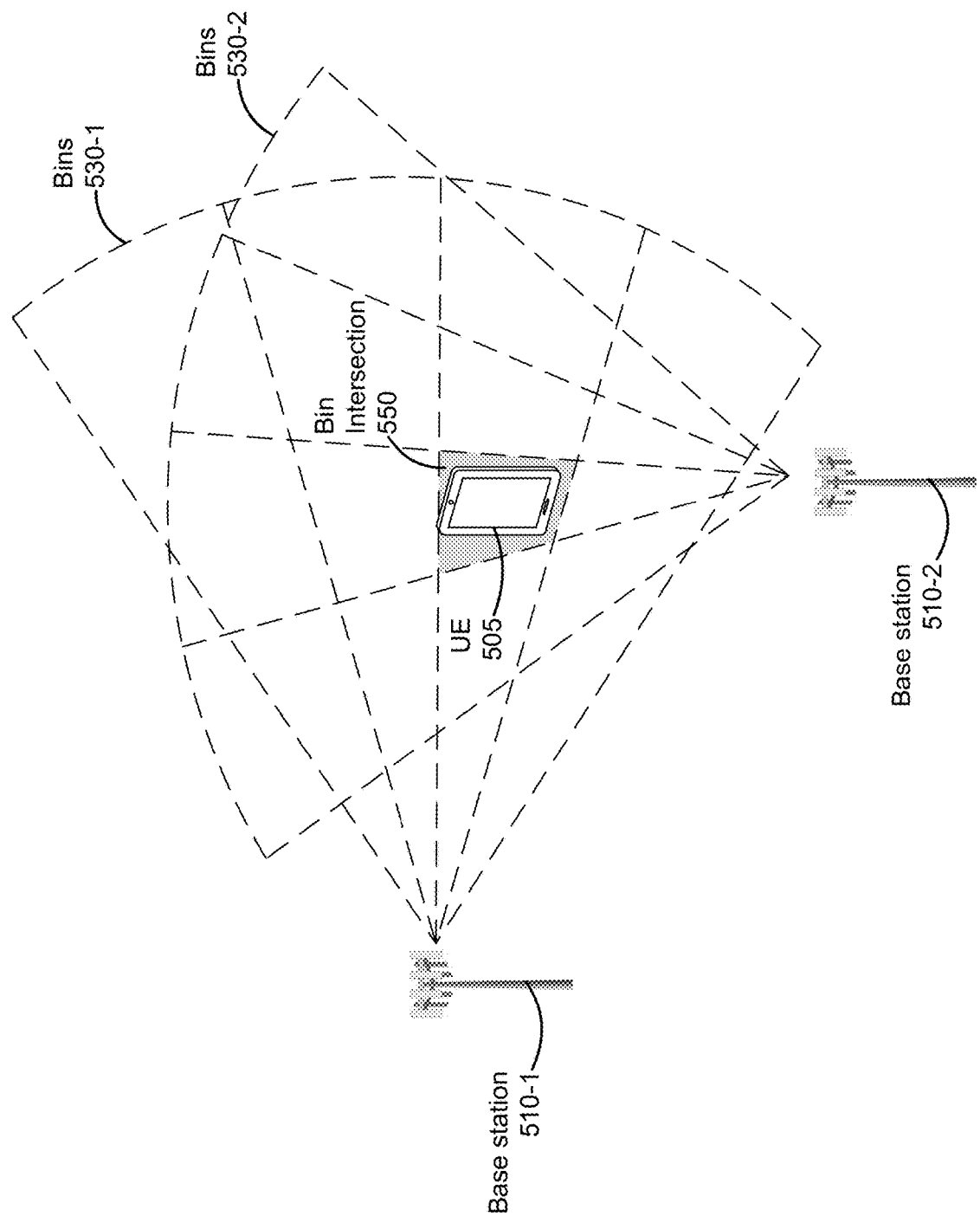

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD. Examples of how PRS (and/or other RF signals) can be used for OTDOA, AoD, and RTT-based positioning are described hereafter in relation to FIGS. 3-5. It can be noted that, although examples shown in FIGS. 3-5 illustrate and discuss base stations (which may correspond to gNBs 210 and/or ng-eNB 214 of FIG. 2 and/or base stations 120 of FIG. 1), positioning techniques may use specific TRPs of base stations to provide accurate positioning.

Figure 3:
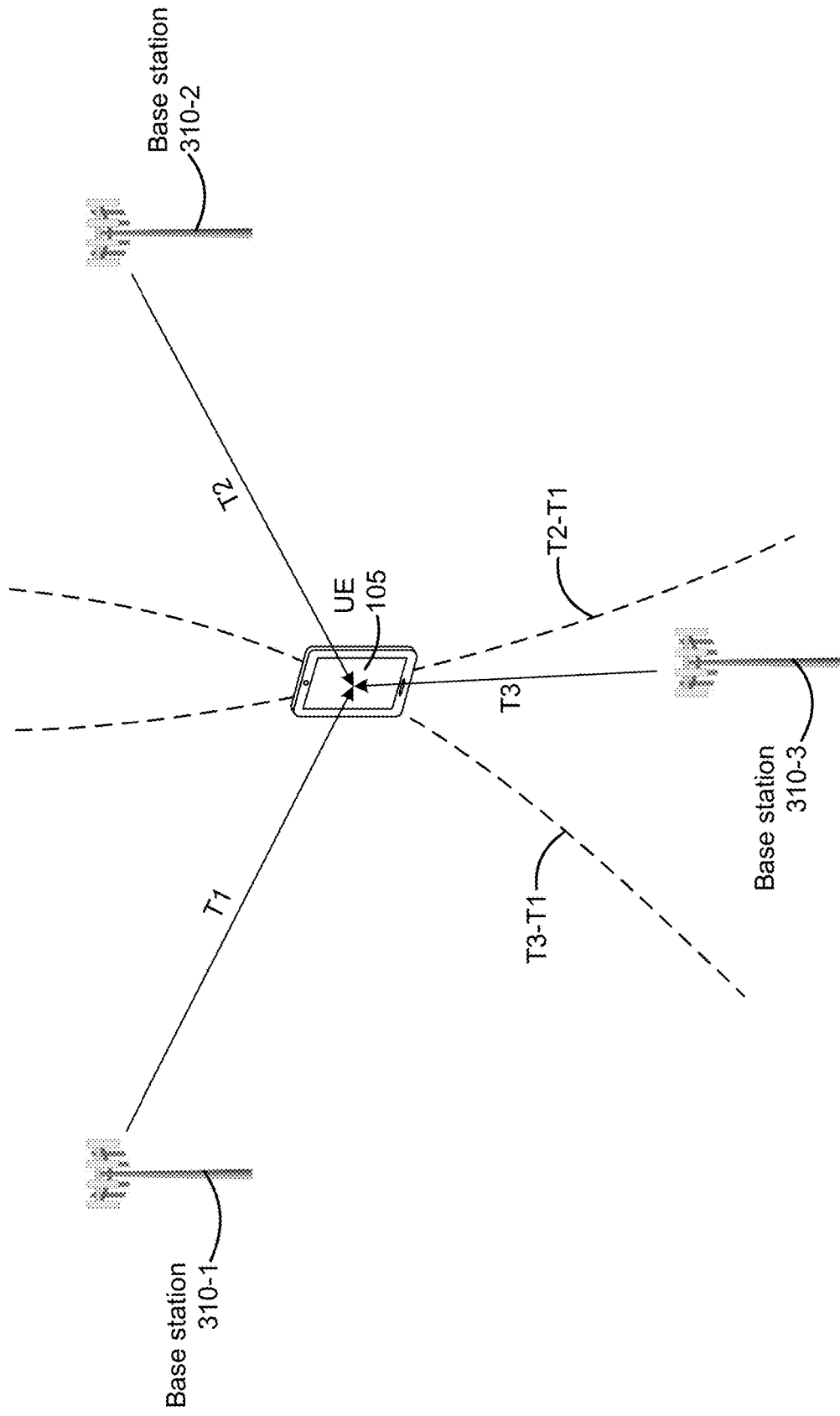
FIGS. 3-5 are illustrations of different types of positioning methods used to determine the location of a UE.

FIG. 3 is an illustration how OTDOA-based positioning (also known as downlink time difference of arrival (DL-TDOA)) can be made, according to some embodiments. In brief, OTDOA-based positioning is positioning made based on known positions of base stations (e.g., base stations 310-1, 310-2, and 310-3, collectively and generically referred to herein as base stations 310), known times at which base stations transmit respective reference signals (e.g., PRS), and differences in times at which the UE 105 receives the reference signals from each base station.

In OTDOA-based positioning, a location server may provide OTDOA assistance data to a UE P105 for a reference base station (which may be called a "reference cell" or "reference resource"), and one or more neighboring base stations (which may be called "neighbor cells" or "neighboring cells", and which individually may be called a "target cell" or "target resource") relative to the reference base station. For example, the assistance data may provide the center channel frequency of each base station, various PRS configuration parameters (e.g., NPRS, TPRS, muting sequence, frequency hopping sequence, PRS ID, PRS bandwidth), a base station (cell) global ID, PRS signal characteristics associated with a directional PRS, and/or other base station related parameters applicable to OTDOA or some other position method. OTDOA-based positioning by a UE 105 may be facilitated by indicating the serving base station for the UE 105 in the OTDOA assistance data (e.g., with the reference base station indicated as being the serving base station). In some aspects, OTDOA assistance data may also include "expected Reference Signal Time Difference (RSTD)" parameters, which provide the UE 105 with information about the RSTD values the UE 105 is expected to measure at its current location between the reference base station and each neighbor base station, together with an uncertainty of the expected RSTD parameter. The expected RSTD, together with the associated uncertainty, may define a search window for the UE 105 within which the UE 105 is expected to measure the RSTD value. OTDOA assistance information may also include PRS configuration information parameters, which allow a UE 105 to determine when a PRS positioning occasion occurs on signals received from various neighbor base stations relative to PRS positioning occasions for the reference base station, and to determine the PRS sequence transmitted from various base stations in order to measure a TOA or RSTD. TOA measurements may be RSRP (Reference Signal Receive Power) measurements of average power of Resource Elements (RE) that carry PRS (or other reference signals).

Using the RSTD measurements, the known absolute or relative transmission timing of each base station, and the known position(s) of wireless node physical transmitting antennas for the reference and neighboring base stations, the UE position may be calculated (e.g., by the UE 105 or by a location server). More particularly, the RSTD for a neighbor base station "k" relative to a reference base station "Ref," may be given as the difference in TOA measurements of signals from each base station (i.e., $TOA_k - TOA_{Ref}$), where the TOA values may be measured modulo one subframe duration (1 ms) to remove the effects of measuring different subframes at different times. In FIG. 3, for example, a first base station 310-1 may be designated as the reference base station, and second and third base stations (P110-2 and 310-3) are neighbor base stations. If UE 105 receives reference signals from first base station 310-1, second base station 310-2, and third base station 310-3 at times T1, T2, and T2, respectively, then the RSTD measurement for second base station 310-2 would be determined as T2-T1 and the RSTD measurement for third base station 310-3 would be determined as T3-T1. RSTD measurements can be used by the UE 105 and/or sent to a location server to determine the location of the UE 105 using (i) the RSTD measurements, (ii) the known absolute or relative transmission timing of each base station, (iii) the known position(s) of base stations 310 for the reference and neighboring base stations, and/or (iv) directional PRS characteristics such as a direction of transmission. Geometrically, information (i)-(iv) allows for possible locations of the UE 105 to be determined for each RSTD (where each RSTD results in a hyperbola, as shown in FIG. 3), and the position of the UE 105 to be determined from the intersection of the possible locations for all RSTDs.

FIG. 4 is an illustration how RTT-based positioning (or multi-RTT) can be made, according to some embodiments. In brief, RTT-based positioning includes positioning methods in which the position of the UE 105 is determined based on known positions of base stations (e.g., base stations 410, which again may correspond to gNBs 210 and/or ng-eNB 214 of FIG. 2), and known distances between the UE 105 and the base stations. RTT measurements between the UE 105 and each base station are used to determine a distance between the UE 105 and the respective base station, and multilateration can be used to determine the location of the UE 105.

In RTT-based positioning, a location server may coordinate RTT measurements between the UE 105 and each base station. Information provided to the UE 105 may be included in RTT assistance data. This can include, for example, reference signal (e.g., PRS) timing and other signal characteristics, base station (cell) ID, and/or other cell related parameters applicable to multi-RTT or some other position method. Depending on desired functionality, RTT measurements may be made (and initiated by) the UE 105 or a base station 410.

RTT measurements measure distance using Over The Air (OTA) delay. An initiating device (e.g., the UE 105 or a base station 410) transmits a first reference signal at first time, T1, which propagates to a responding device. At a second time, T2, the first reference signal arrives at the responding device. The OTA delay (i.e., the propagation time it takes for the first reference signal to travel from the initiating device to the responding device) is the difference between T1 and T2. The responding device then transmits a second reference signal at a third time, T3, and the second reference signal is received and measured by the initiating device at a fourth time, T4. RSRP measurements may be used to determine TOA for times T2 and T4. Distance, d, between the initiating and responding devices therefore can be determined using the following equation:

$$\frac{2d}{c} = (T_4 - T_1) - (T_3 - T_2) = (T_4 - T_1) + (T_2 - T_3). \quad (1)$$

(As will be appreciated, distance, d, divided by the speed of RF propagation, c, equals the OTA delay.) Thus, a precise determination of the distance between the initiating device and responding device can be made.

RTT measurements between the UE 105 and base stations 410 can therefore allow the position of the UE 105 to be determined using multilateration. That is, RTT measurements between the UE 105 and the first base station 410-1, second base station 210-2, and third base station 410-3 (RTT measurements RTT1, RTT2, and RTT3, respectively) result in a determination of the distance of the UE 105 from each of the base stations 410. These distances can be used to trace circles around known positions of the base stations 410 (where Circle1 corresponds to base station 410-1, Circle2 corresponds to base station 410-2, and Circle3 corresponds to base station 410-3.) The position of the UE 105 can be determined as the intersection between the circles.

FIG. 5 is an illustration how AoD-based positioning (or DL-AoD) can be made, according to some embodiments. In brief, AoD-based positioning is positioning made based on reference signals (e.g., PRS) received by the UE 505, transmitted by certain beams of the base stations 510, and a corresponding coverage area covered by the beams.

In AoD-based positioning, a location server may provide AoD assistance data to a UE 505. This assistance data, which may be based on an approximate location of the UE 505, may provide information regarding reference signals for nearby base stations 510, including center channel frequency of each base station, various PRS configuration parameters (e.g., NPRS, TPRS, muting sequence, frequency hopping sequence, PRS ID, PRS bandwidth, beam ID), a base station (cell) global ID, PRS signal characteristics associated with a directional PRS, and/or other base station related parameters applicable to AoD or some other position method.

Using this information, the UE 505 and/or location server can determine the UE's location by the beam(s) with which the UE 505 detects a PRS from each base station 510. More specifically, a PRS from a base station 510 is transmitted via a beam centered along angular regions, or bins 530. Thus, each bin can correspond to a PRS from a different respective beam. Bins 530 from different base stations 510 can form an angular grid that can be used to determine the location of the UE 505. For example, as illustrated in FIG. 3, bins 530-1 of base station 510-1 intersect with bins 530-2 of base station 510-2 to form an angular grid. The UE 505 can measure (e.g., using RSRP measurements) the PRS of different beams of each base station 510. These measurements can be used by the UE 505 or sent to the location server to determine the location of the UE 505 from the corresponding bin intersection 550, where the bin 530-1 corresponding to the PRS of a first base station 510-1 intersects with the bin 530-2 corresponding to the PRS of a second base station 510-2. Similar measurements can be made from additional base stations (not shown) to provide additional accuracy. Additionally or alternatively, measurements from multiple beams of a single base station 510 can enable interpolation for higher-resolution positioning.

Figure 6:
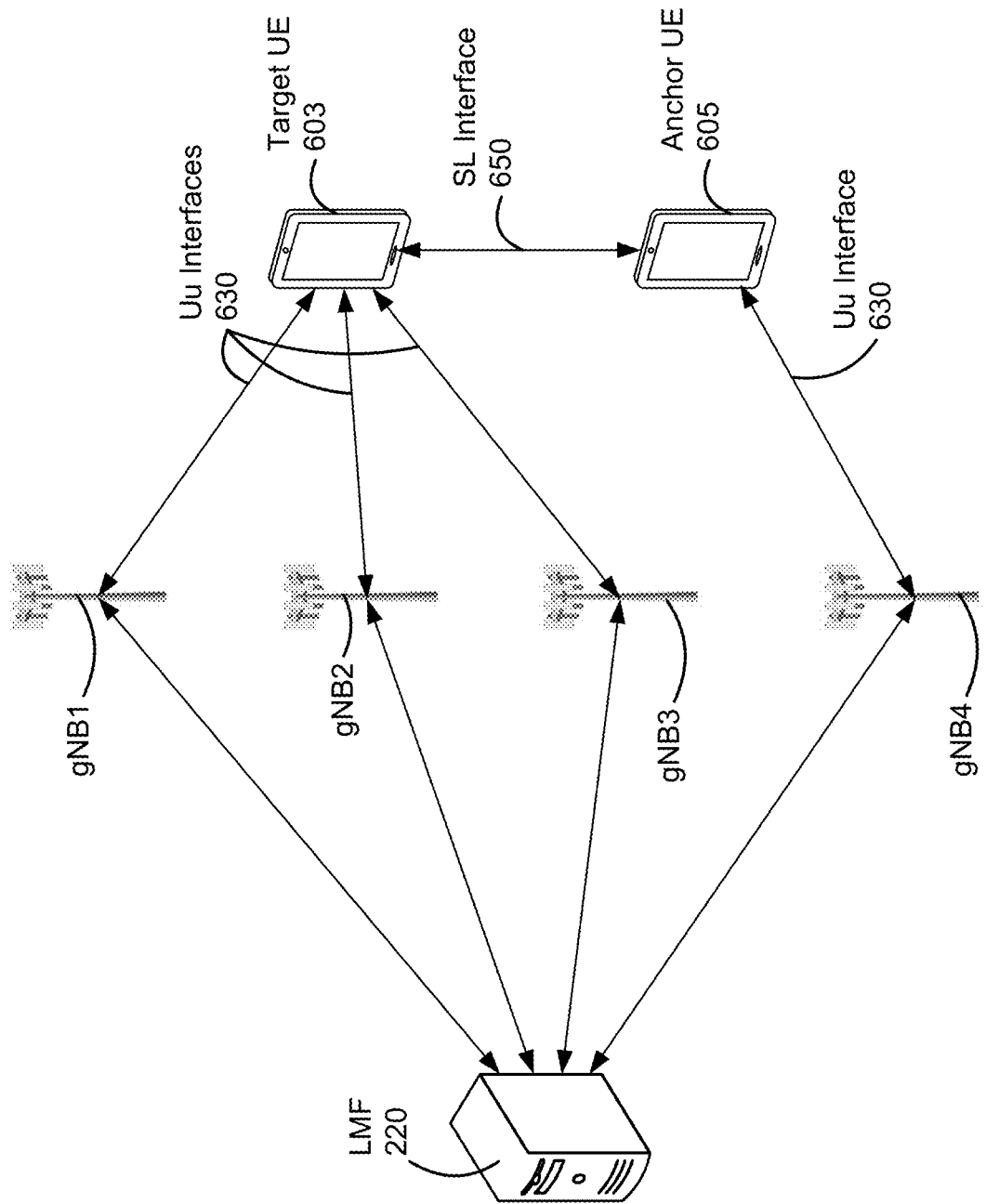
FIG. 6 is a simplified diagram illustrating how an anchor UE can be used in the positioning of a target UE in a 5G NR network, according to an embodiment.

Although the positioning methods in FIGS. 3-5 traditionally use base stations (as shown) as anchor points by which to determine the position of target UE 603, 5G NR is developing the possibility of using other UEs as anchor points in addition or as an alternative to base stations, as previously indicated with regard to UEs 145 of FIG. 1. FIG. 6 provides a more detailed example.

FIG. 6 is a simplified diagram illustrating how an anchor UE 605 can be used in the positioning of a target UE 603 in a 5G NR network, according to an embodiment. Here, arrows between the various components illustrate communication links. As illustrated in FIG. 2, this may involve wireless and/or wired communication technologies and may include one or more intermediary components. For simplicity, gNBs (e.g., corresponding to gNBs 210 of FIG. 2) are simply labeled gNB1-gNB4, and a single anchor UE 605 is illustrated. Although only one anchor UE 605 may be used in some instances, other instances may use two or more. Moreover, in some instances, anchor UEs 605 may comprise the only type of anchor point for positioning and/or gNBs not be used as anchor points. (Again, as used herein, the term "anchor point" refers to a device with a known location used to determine the location of the target UE 603.)

To determine the position of the target UE 603 (e.g., using any of the previously-described positioning techniques) the target UE 603 can take measurements of wireless signals sent from different anchor points: gNB1-gNB3 and anchor UE 605. As indicated in FIG. 4, the target UE 603 can communicate with and/or obtain measurements from gNB1-gNB3 using a Uu (network) interface 630. Measurements may be made from reference signals from the gNBs, such as PRS (e.g., DL-PRS). With regard to anchor UE 605, target UE 603 can communicate using SL interface 650. As previously noted, and SL interface 650 allows direct (D2D) communication between the target UE 603 and anchor UE 605, and may be used in a manner similar to the Uu interfaces 630, allowing the target UE 603 to obtain position-related measurements in relation to determining the location of the target UE 603. As such, the anchor UE 605 may be configured to provide a PRS (e.g., SL-PRS) and/or similar reference signal, which may be transmitted in a manner similar to a gNB. For its part, the anchor UE 605 may also communicate with the LMF 220 via gNB4 using a Uu interface 630. In this example, gNB4 may comprise the serving gNB for anchor UE 605.

The use of an anchor UE 605 in the positioning of the target UE 603 is similar to the use of base stations in FIGS. 3-5 for OTDOA, RTT, and AoD-based positioning. However, specific details regarding the use of an anchor UE 605 are yet undetermined. There are no definitions for SL-based or SL-assisted measurements in LPP reporting. And it is unclear what type of reporting is to be provided by the target UE 603.

According to embodiments herein, target UE 603 and anchor UE 605 may be configured to provide measurements specific to SL-assisted positioning (e.g., positioning using SL-based or SL-assisted measurements). That is, for positioning in which at least one anchor UE 605 is used as an anchor point, the target UE 603 and/or at least one anchor UE 605 may be configured by the LMF 220 and/or a gNB to take certain SL-based and/or SL-assisted measurements to facilitate SL positioning. When configured by gNBs, the target UE 603 be configured by its serving gNB (gNB1) and anchor UE 605 may be configured by its serving gNB (gNB4)).

An example of a measurement specific to SL-assisted positioning, according to some embodiments, is an RSTD measurement involving one or more anchor UEs 605. As previously described, and RSTD measurement can be made by determining a difference in PRS TOA from two different network nodes: a reference node and a neighbor node. Because the reference node is used in multiple RSTD measurements for OTDOA positioning, the reference notes accuracy can be especially important to the ultimate accuracy of the OTDOA position determination. As such, according to some embodiments, if a gNB is available for SL-assisted OTDOA position determination, the gNB can be used as the reference node for RSTD measurements and one or more anchor UEs 605 can be used as the neighbor nodes. This is because aspects of the gNB pertaining to accuracy (e.g., known location, drift rate, etc.) tend to be more accurate than those of a UE. As such, using the gNB as the reference node for RSTD measurements in SL-assisted OTDOA position determination of the target UE 603 can result in higher accuracy than if an anchor UE 605 is used as the reference node. According to some embodiments, the LMF 220 can indicate to the target UE 603 which gNB to use as a reference node and/or indicate to the target UE 603 not to use the anchor UE 605 as the reference node for RSTD measurements.

That said, embodiments still may use an anchor UE 605 as a reference node. An anchor UE 605 may be used as the reference node in instances in which a gNB is not available for OTDOA positioning, for example. Additionally or alternatively, if an anchor UE 605 meet certain accuracy requirements, it may be used as a reference node. For example, if the anchor UE 605 has an accurate synchronization source that can reduce the effects of drift rate, has a position with an uncertainty value of a below a certain threshold, and/or meets similar accuracy-related conditions or an overall accuracy threshold, it may be used as a reference node.

Another measurement specific to SL-assisted positioning is RTT using an SL interface 650 between a target UE 603 and a reference node 605. In an RTT measurement using the SL interface 650, both the target UE 603 and anchor UE 605 take Rx-Tx measurements. (As referred to herein, the term "Rx-Tx measurements" refers to time-difference measurements taken by initiating and receiving devices for an RTT measurement.) The RTT measurement in this case may be an SL-assisted measurement in which the target UE 603 initiates the RTT measurement, or an SL-based measurement, where the anchor UE 605 initiates the RTT measurement.

According to some embodiments, the anchor UE 605 may perform RTT in either a "transparent mode" or an "advanced mode," which may be based on the capabilities of the target UE 603 and/or anchor UE 605. In the transparent mode, the anchor UE 605 can provide Uu-like functionality over the SL interface 650, mimicking the functionality of a gNB across a Uu interface 630 (e.g., providing a Uu-like PRS) to perform, or obtain, the RTT measurement. In transparent mode, the LMF 220 can communicate with the target UE 603 and anchor UE 605 to coordinate the RTT measurement, and both the target UE 603 and anchor UE 605 can report its respective Rx-Tx measurement to the LMF 220 to determine the RTT. Because the anchor UE 605 behaves like a gNB in the transparent mode, it can allow an older target UE 603 that might not be otherwise capable of performing RTT over an SL interface 650 to do so.

In the advanced mode, one UE may report its respective Rx-Tx measurement to the other. That is, for an SL-based RTT measurement initiated by the anchor UE 605, the target UE 603 can provide its respective Rx-Tx measurement (or difference between RTT transmit and receive signals) to the anchor UE 605, which can then relay Rx-Tx measurement for both the target UE 603 and anchor UE 605 to the LMF 220. For an SL-assisted RTT measurement initiated by the target UE 603, the anchor UE 605 can provide its respective Rx-Tx measurement to the target UE 603, which can then relay Rx-Tx measurement for both the target UE 603 and anchor UE 605 to the LMF 220. In this way, the advanced mode may need only a single LPP session between the LMF 220 and the UE initiating the RTT measurement, rather than separate LPP sessions from each UE (which can be the case in transparent mode). That said, in some instances and/or embodiments of the advanced mode, each UE may have a separate LPP session and/or provide a separate report.

The determination of whether to use the transparent mode or advanced mode can vary, depending on desired functionality. According to some embodiments, this determination may be made by the LMF 220, based on capabilities of the anchor UE 605 and target UE 603. For example, an LMF 220 may determine (e.g., via a 3GPP release number of the target UE 603) that the target UE 603 is not capable of taking an RTT measurement using SL interface 650 in an advanced mode. Thus, the LMF 220 may configure the anchor UE 605 to operate in a transparent mode using, for example, direct (e.g., LPP) communication with the anchor UE 605 or communication to gNB4 (e.g., via LPPa), which may then configure anchor UE 605. Additionally or alternatively, the anchor UE 605 may make this same determination when establishing the SL interface 650 with the target UE 603. In either case, the anchor UE 605 can operate in a transparent mode when taking an RTT measurement using SL interface 650, based on this determination.

Angle-based measurements using SL interface 650 may be used, according to some embodiments, in cases in which the anchor UE 605 is capable of beamforming to provide AoD/AoA measurements. Depending on desired functionality, AoD measurements based on PRS RSRP using SL interface 650 (e.g. "SLTx AoD") may be reported in the same manner as DL AoD measurements of gNBs (based on DL PRS RSRP measurements). That is, the UE 150 can report RSRP of a PRS transmitted on a beam of the anchor UE 605 via SL interface 650. Similarly, AoA measurements by the anchor UE 605 based on PRS RSRP using SL interface 650 (e.g. "SLRx AoA") may be reported in the same manner as UL AoA measurements at gNBs (based on UL PRS RSRP measurements). That is, the anchor UE 605 can report RSRP of a PRS transmitted by the target UE 603.

However, for these SL angle-based measurements, target UE 603 and/or anchor UE 605 may provide an additional information. Traditionally, a gNB would take AoD and AoA measurements of target UE 603, given the fact that the gNB has much more antennas and therefore a much higher beamforming resolution. Angle measurements taken by the target UE 603 are unlikely to add any additional information in such instances. However, due to the symmetry in the SL interface 650 between target UE 603 and anchor UE 605, both UEs (105, 605) may take additional measurements. For example, not only can an anchor UE 605 provide SL-PRS on a beam that is measured by the target UE 603 to determine AoD, but the target UE 603 may further take an Rx AoA measurement. The roles can be reversed when the target UE 603 provides a signal to an anchor UE 605: the anchor UE 605 can take both RSRP measurements to determine AoD, as well as AoA measurements. Thus, unlike traditional embodiments, embodiments in which SL angle-based measurements are taken can include angle-based measurements taken by the target UE 603. This information can be used by the LMF 220 or target UE 603 for position determination of the target UE 603.

To enable SL angle-based position determination, an orientation of the anchor UE 605 (and perhaps the target UE 603) may be needed. As such, the anchor UE 605 (and optionally the target UE 603) further may provide an orientation report, indicating its orientation when transmitting a signal (e.g., PRS). Unlike gNBs that have a known, fixed orientation (resulting in beams with respective known angles/coverage areas) the orientation of the target UE 603 and/or anchor UE 605 may be subject to change. And thus, a knowledge of the orientation of the respective UE at the time a signal is transmitted can be used in the determination of the location of target UE 603 in conjunction with AoD/AoA measurements. Depending on desired functionality, the orientation can be reported in the global coordinate system (GCS) or a local coordinate system (LCS), for example, which may be defined under a governing standard (e.g., 3GPP).

Other embodiments may enable "rich reporting" measurements that provide additional information beyond traditional measurement reporting. For example, the target UE 603 or anchor UE 605 can report Doppler, Power Delay Profile (PDP), polarization phase, "used same Rx-beam" indication, group delay information, waveform, and/or similar information. This information, too, can be used in the determination of the location of the target UE 603, according to some embodiments.

Additionally, depending on desired functionality measurement reports may be sent to different entities. For network-based positioning, measurement reports from the target UE 603 and/or anchor UE 605 may be provided to the LMF 220. In some embodiments, a measurement report may be sent from a first UE (e.g., target UE 603 or anchor UE 605) to a second UE (e.g., anchor UE 605 or target UE 603) via the SL interface, which is then relayed to the LMF 220 by the second UE. For UE-based positioning (in which the location of the target UE 603 is determined by the target UE 603), a measurement report of the anchor UE 605 may be provided to the target UE 603 direction via the SL interface 650 or indirectly via the LMF 220.

It can be noted that the measurement reports for SL-assisted positioning using the techniques herein may be communicated in a manner similar to measurement reports in traditional LPP sessions. That is, the general procedure for LPP sessions may comprise establishing the LPP session, exchanging positioning capabilities (e.g., using RequestCapabilities and ProvideCapabilities information elements (IEs)), transferring assistance data (e.g., using RequestAssistanceData and ProvideAssistanceData IEs), and transferring location information (e.g., positioning measurements and/or position estimates via RequestLocationInformation and ProvideLocationInformation IEs). As an example of the communication of a measurement report, the LMF 220 can configure the target UE 603 (e.g., in an assistance data exchange or request location information exchange) regarding what to provide in a report (e.g., what to include in the report, which signal to measure, etc.). As another example, in an advanced mode, an anchor UE 605 or target UE 603 may provide its Rx-Tx measurement to the other UE and/or provide the measurement report via ProvideLocationInformation. And yet it another example in which angle-based positioning is performed, the LMF 220 may provide information to an anchor UE 605 (via LPP or NRPPa) in response to an information request for angle/beam/orientation information.

Figure 7A:
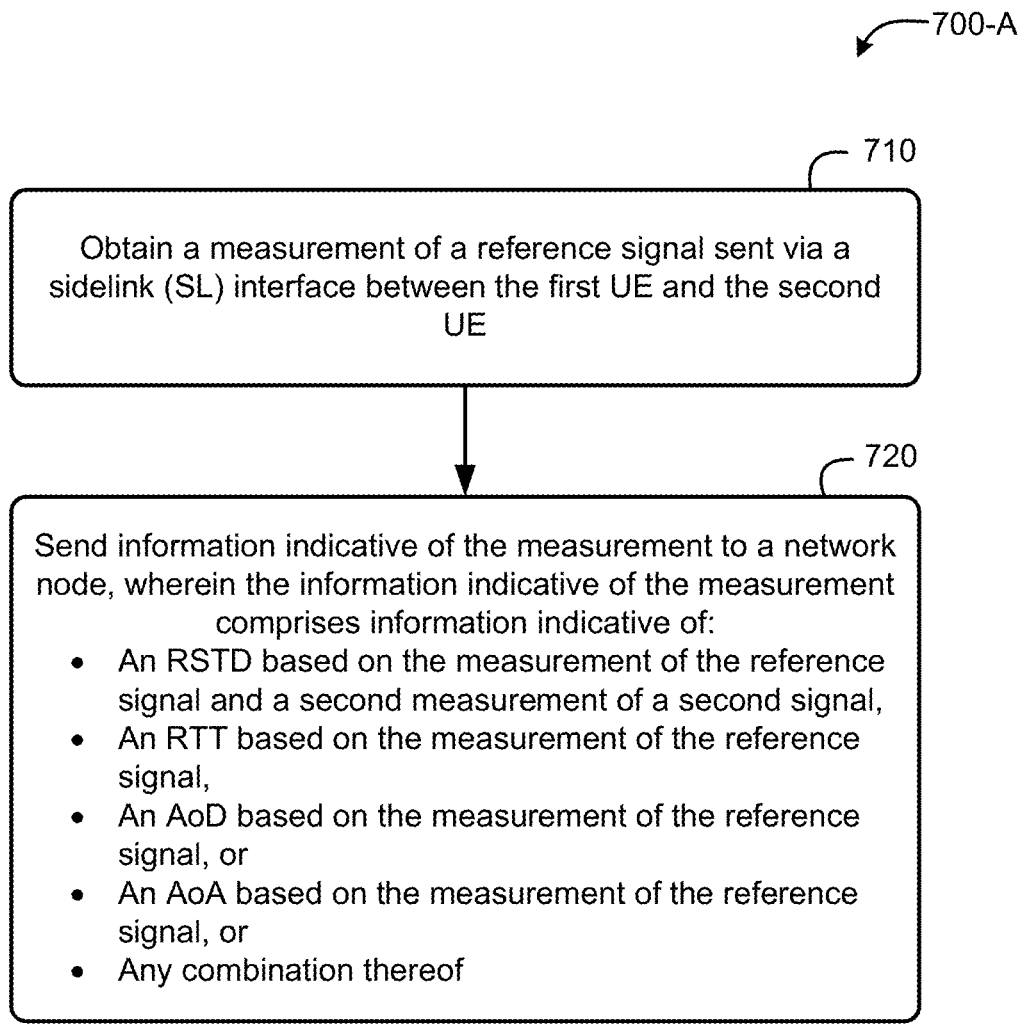
FIGS. 7A and 7B are a flow diagrams of methods of providing a measurement report related to an SL interface used in determining a location of a target UE, according to some embodiments.

FIG. 7A is a flow diagram of method 700-A of providing a measurement report for determining a location of a first UE, according to an embodiment. In some aspects, the method 700-A describes a method performed by a first UE, corresponding to the target UE 603 as previously described in relation to FIG. 6 or a second UE, corresponding to the anchor UE 605 of FIG. 6. Alternative embodiments may perform the functions in different order, in parallel, and/or may otherwise rearrange the flow of functions illustrated in FIG. 7A. Means for performing the functionality illustrated in the blocks shown in FIG. 7A may be performed by hardware and/or software components of a UE. Example components of a UE are illustrated FIG. 8, which are described in more detail below.

Figure 8:
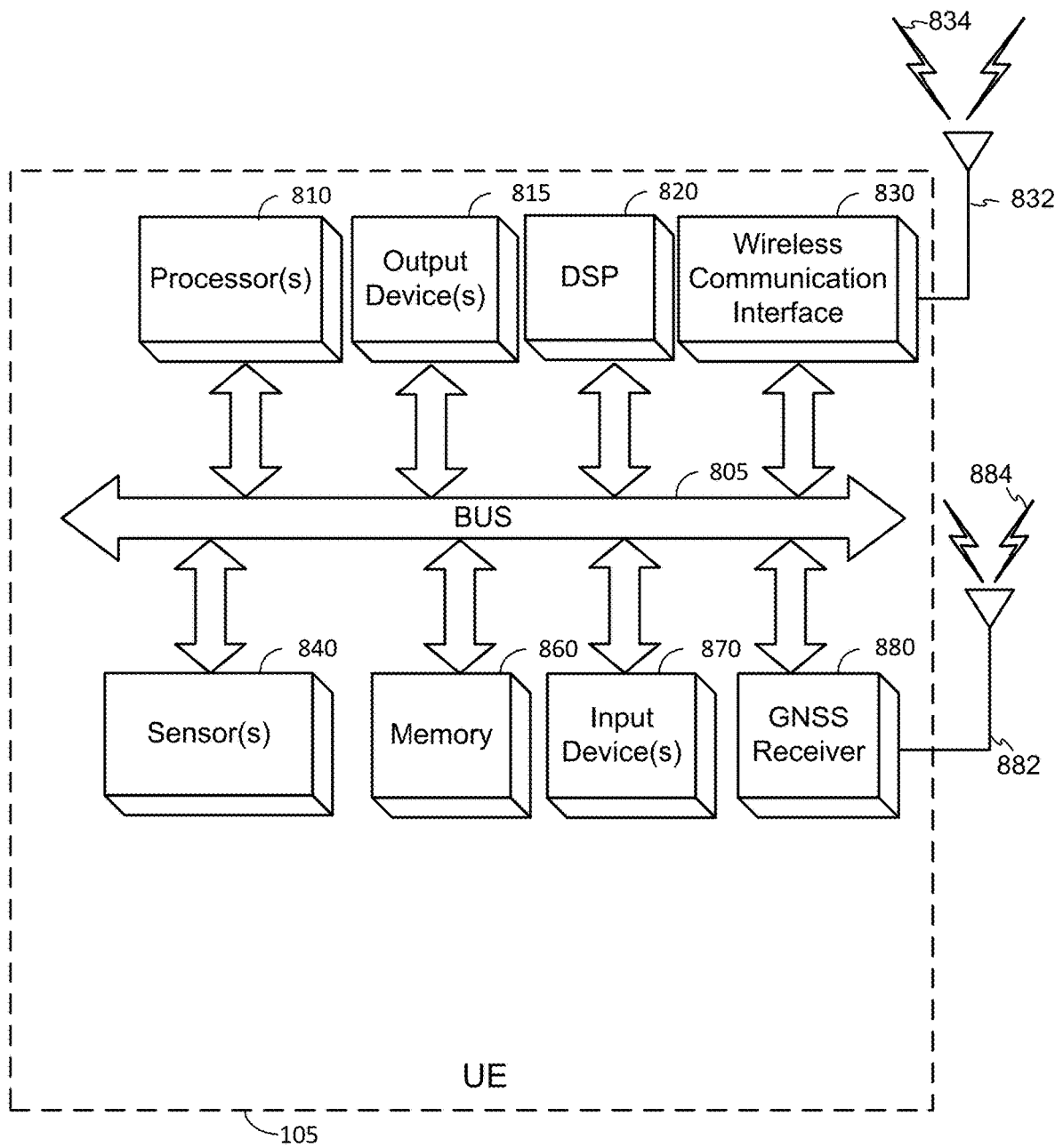
FIG. 8 illustrates an embodiment of a UE, which can be utilized in embodiments as described herein.

At block 710, the functionality comprises obtaining a measurement of a reference signal sent via an SL interface between the first UE and a second UE. As noted, the functionality of FIG. 7A may be performed by the target UE 603 or anchor UE 605 of FIG. 6. As such, according to some embodiments, the measurement may be obtained by the first UE or the second UE. The reference signal may comprise an SL-PRS, and the measurement may comprise an RSRP and/or TOA measurement. The type of measurement taken may be based on the type positioning (e.g., OTDOA, RTT, AoA, or AoD-based positioning). Means for performing functionality at block 710 may comprise a wireless communication interface 830, bus 805, memory 860, processor(s) 810, digital signal processor (DSP) 820, and/or other components of a UE, such as the UE 105 as illustrated in FIG. 8 and described in more detail below.

At block 720, the functionality comprises sending information indicative of the measurement. As further shown in block 720, according to some embodiments, the information indicative of the measurement may comprise information indicative of an RSTD based on the measurement of the reference signal and a second measurement of a second signal, an RTT based on the measurement of the reference signal, an AoD based on the measurement of the reference signal, or an AoA based on the measurement of the reference signal, or any combination thereof. If the reference signal is measured at the first UE, information may be sent to a location server. If the reference signal is measured at the second UE, the information may be sent to the first UE or to a location server.

As previously noted, an RSTD may be determined from TOA measurements of reference signals received via the SL interface and a Uu interface. In such instances, the second signal is transmitted by a base station, and the reference signal is measured at the first UE, which can determine the RSTD at least in part by using the base station as a reference node for the RSTD determination. The use of the base station as a reference node can be based on the first UE's determination that the second reference signal is transmitted by a base station. Alternatively, the use of the base station as the reference node can be based on the first UE receiving an indication to do so by a location server.

However, as noted, a UE may be used as a reference node in instances in which the UE is determined to meet a accuracy threshold. Thus, in some embodiments of the method 700-A, in which the reference signal is measured at the first UE and the information indicative of the measurement comprises information indicative of the RSTD based on the measurement of the reference signal and a second measurement of a second reference signal, the first UE may receive an indication that the second UE meets an accuracy threshold (e.g., directly from the second UE, or via a location server or base station), and responsive to the indication that the second UE meets the accuracy threshold, the first UE may use the second UE as a reference node in determining the RSTD.

As noted, reporting of RTT-related measurements may vary, depending on desired functionality. RTT can be initiated by the first UE (e.g., target UE 603 and FIG. 6) or the second UE (e.g., anchor UE 605). In either case, and Rx-Tx measurement made by one UE based on the reference signal (e.g., a TOA of the reference signal) can be sent to the other, to be relayed by the other to a location server. Additionally or alternatively, the other UE may determine the RTT based on the Rx-Tx measurements from both UEs, then provide the RTT measurement to the location server. As such, alternative embodiments of the method 700-A may further comprise determining a first Rx-Tx measurement based on the reference signal and receiving a second Rx-Tx measurement via the SL interface. In such cases, sending the information indicative of the RTT based on the measurement of the reference signal comprises sending the first Rx-Tx measurement and the second Rx-Tx measurement, or the RTT determined from the first Rx-Tx measurement and the second Rx-Tx measurement, or any combination thereof.

As noted in the previously-described embodiments, angle measurements for AoD and AoA determinations can be made via the SL interface and reported to a location server or the first UE. AoD determinations can be made based on an RSRP measurement from the device measuring the one or more reference signals sent by the first UE or the second UE, along with an identification of the beam used to transmit the reference signal measured and an orientation of the transmitting UE. Similarly, AoA determinations can be made based on beam and orientation information from the receiving UE. Accordingly, according to some embodiments of the method 700-A, the indication of the AoD based on the measurement of the reference signal comprises an RSRP measurement and beam ID (or beam index) of the reference signal. Additionally or alternatively, according to some embodiments of the method 700-A, the indication of the AoA based on the measurement of the reference signal comprises an orientation and receiving beam or angle of a device measuring the reference signal, wherein the device comprises the first UE or the second UE.

Means for performing functionality at block 720 may comprise a wireless communication interface 830, bus 805, memory 860, processor(s) 810, DSP 820, and/or other components of a UE, such as the UE 105 as illustrated in FIG. 8 and described in more detail below.

Figure 7B:
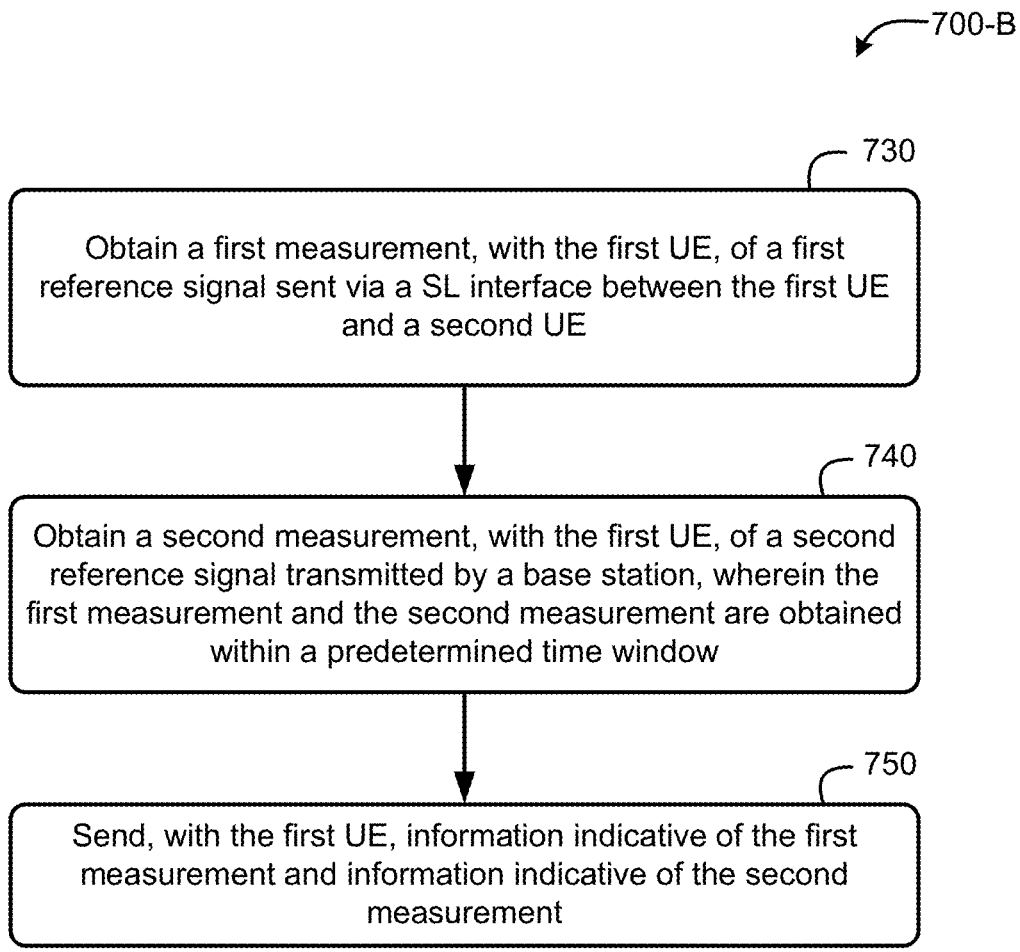

FIG. 7B is a flow diagram of method 700-B of providing a measurement report for determining a location of a first UE, according to another embodiment. Similar to the method 700-A of FIG. 7A, aspects of the method 700-B describe a method performed by a first UE, corresponding to the target UE 603 as previously described in relation to FIG. 6. Here, however, the second UE may correspond to the anchor UE 605 of FIG. 6. Alternative embodiments may perform the functions in different order, in parallel, and/or may otherwise rearrange the flow of functions illustrated in FIG. 7B. Means for performing the functionality illustrated in the blocks shown in FIG. 7B may be performed by hardware and/or software components of a UE. Example components of a UE are illustrated FIG. 8, which are described in more detail below.

At block 730, the functionality comprises obtaining a first measurement, with the first UE, of a first reference signal sent via an SL interface between the first UE and a second UE. As noted previously, the first UE may correspond with the target UE 603 of FIG. 6 and the second UE may correspond with anchor UE 605 of FIG. 6. The reference signal may comprise an SL-PRS, for example, and the measurement may comprise an RSRP and/or TOA measurement. The type of measurement taken may be based on the type positioning (e.g., RSTD, RTT, AoA, or AoD-based positioning). Means for performing functionality at block 730 may comprise a wireless communication interface 830, bus 805, memory 860, processor(s) 810, digital signal processor (DSP) 820, and/or other components of a UE, such as the UE 105 as illustrated in FIG. 8 and described in more detail below.

At block 720, the functionality comprises obtaining a second measurement, with the first UE, of a second reference signal transmitted by a base station, wherein the first measurement and the second measurement are obtained within a predetermined time window. By measuring a reference signal from a base station, some embodiments may leverage the increased timing and/or location information of the base station when obtaining measurements and/or ultimately determining the location of the first (target) UE. For example, according to some embodiments, the first UE may determine the RSTD at least in part by using the base station as a reference node for the RSTD determination. That said, in some circumstances, embodiments may utilize the second UE as a reference node. For example, according to some embodiments of the method 700-B, the first UE may receive an indication that the second UE meets an accuracy threshold, and, responsive to the indication that the second UE meets the accuracy threshold, the first UE may use the second UE as a reference node in determining the RSTD. Depending on desired functionality, the accuracy threshold may be based on a determine the level of confidence, degree of accuracy, and/or other metric of a determined location for the second UE, for example.

The use of a time window within which first and second reference signals are transmitted, and/or first and second measurements are obtained, can help ensure accuracy when determining the location of the first UE. The smaller the time window, the more likely the UE is at or near the same location for both measurements. The time window may be defined, for example, by a number of Orthogonal Frequency Division Multiplexing (OFDM) slots, a number OFDM subframes, a number OFDM frames, a start time and an end time, a time duration, a number of measurement gaps (MGs), or a number of processing windows, or a combination thereof.

Depending on desired functionality, the time window may be determined dynamically. According to some embodiments, the time window may be determined based on characteristics of the first UE, such as velocity, timing accuracy, clock drift, and/or the like. Other characteristics may be based on reference signal timing, such as reference signal periodicity (of the second UE and/or the base station) and/or the like. In some embodiments, a separate device such as the location server, base station, or second UE may determine the time window and provide it in a configuration to the first UE. In such instances, the method 700-B may further comprise, prior to obtaining the first measurement and the second measurement, receiving information indicative of the predetermined time window with the first UE. In some embodiments, the first UE may determine the time window.

Means for performing functionality at block 740 may comprise a wireless communication interface 830, bus 805, memory 860, processor(s) 810, digital signal processor (DSP) 820, and/or other components of a UE, such as the UE 105 as illustrated in FIG. 8 and described in more detail below.

At block 750, the functionality comprises sending information indicative of the first measurement and information indicative of the second measurement. The information indicative of either the first measurement or the second measurement may be similar to the information described previously with regard to the method 700-A of FIG. 7A. Here, however, the information may be included in a single measurement report, or different measurement reports, and a positioning session to allow a receiving device (e.g., location server) to determine the position of the first UE using both the first measurement and the second measurement. As such, according to some embodiments, the information indicative of the first measurement and/or second measurement may include information enabling the receiving device to associate the first and second measurements. This can include, for example, a flag or other identifier that identifies the first measurement and/or second measurement. According to some embodiments, the second measurement may be tagged with a TRP ID, reference signal ID (e.g., PRS resource), and/or other flag, and the first measurement may be tagged with a UE ID, reference signal ID, and/or the like.

Depending on the type of measurements obtained, the information indicative of the first measurement and/or second measurement may comprise various types of information. For example, according to some embodiments, the information indicative of the first measurement may comprise information indicative of an RTT based on the first measurement of the first reference signal. In such embodiments, obtaining the first measurement may comprise determining a first Rx-Tx measurement based on the first reference signal, wherein the first UE further receives a second Rx-Tx measurement, taken by the second UE, via the SL interface, and sending the information indicative of the RTT based on the measurement of the reference signal may comprise sending the first Rx-Tx measurement and the second Rx-Tx measurement, or the RTT determined from the first Rx-Tx measurement and the second Rx-Tx measurement, or any combination thereof. According to some embodiments, the information indicative of the first measurement may comprise information indicative of an AoD based on the first measurement of the first reference signal. In such embodiments, the indication of the AoD based on the first measurement of the first reference signal may comprise an RSRP measurement and beam ID of the first reference signal. According to some embodiments, the information indicative of the first measurement may comprise information indicative of an AoA based on the first measurement of the first reference signal. In such embodiments, the indication of the AoA based on the first measurement of the first reference signal may comprise an orientation and receiving beam or angle of the first UE. According to some embodiments, sending the information indicative of the first measurement and information indicative of the second measurement may comprise sending the information to a location server.

Means for performing functionality at block 750 may comprise a wireless communication interface 830, bus 805, memory 860, processor(s) 810, DSP 820, and/or other components of a UE, such as the UE 105 as illustrated in FIG. 8 and described in more detail below.

FIG. 8 illustrates an embodiment of a UE 105, which can be utilized as described herein above (e.g., in association with FIGS. 1-7). For example, the UE 105 can perform one or more of the functions of the method shown in FIGS. 7A and 7B. It should be noted that FIG. 8 is meant only to provide a generalized illustration of various components, any or all of which may be utilized as appropriate. It can be noted that, in some instances, components illustrated by FIG. 8 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 8.

The UE 105 is shown comprising hardware elements that can be electrically coupled via a bus 805 (or may otherwise be in communication, as appropriate). The hardware elements may include a processor(s) 810 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 810 may comprise one or more processing units, which may be housed in a single integrated circuit (IC) or multiple ICs. As shown in FIG. 8, some embodiments may have a separate DSP 820, depending on desired functionality. Location determination and/or other determinations based on wireless communication may be provided in the processor(s) 810 and/or wireless communication interface 830 (discussed below). The UE 105 also can include one or more input devices 870, which can include without limitation one or more keyboards, touch screens, touch pads, microphones, buttons, dials, switches, and/or the like; and one or more output devices 815, which can include without limitation one or more displays (e.g., touch screens), light emitting diodes (LEDs), speakers, and/or the like.

The UE 105 may also include a wireless communication interface 830, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. The wireless communication interface 830 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 832 that send and/or receive wireless signals 834. According to some embodiments, the wireless communication antenna(s) 832 may comprise a plurality of discrete antennas, antenna arrays, or any combination thereof. The antenna(s) 832 may be capable of transmitting and receiving wireless signals using beams (e.g., Tx beams and Rx beams). Beam formation may be performed using digital and/or analog beam formation techniques, with respective digital and/or analog circuitry. The wireless communication interface 830 may include such circuitry.

Depending on desired functionality, the wireless communication interface 830 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named "3rd Generation Partnership Project 2" (3GPP2). 3GPP and 3GPP2 documents are publicly available. A WLAN may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 840. Sensor(s) 840 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 105 may also include a Global Navigation Satellite System (GNSS) receiver 880 capable of receiving signals 884 from one or more GNSS satellites using an antenna 882 (which could be the same as antenna 832). Positioning based on GNSS signal measurement can be utilized to complement and/or incorporate the techniques described herein. The GNSS receiver 880 can extract a position of the UE 105, using conventional techniques, from GNSS satellites 110 of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 880 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 880 is illustrated in FIG. 8 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 810, DSP 820, and/or a processor within the wireless communication interface 830 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 810 or DSP 820.

The UE 105 may further include and/or be in communication with a memory 860. The memory 860 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 860 of the UE 105 also can comprise software elements (not shown in FIG. 8), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 860 that are executable by the UE 105 (and/or processor(s) 810 or DSP 820 within UE 105). In some embodiments, then, such code and/or instructions can be used to configure and/or adapt a general-purpose computer (or other device) to perform one or more operations in accordance with the described methods.

Figure 9:
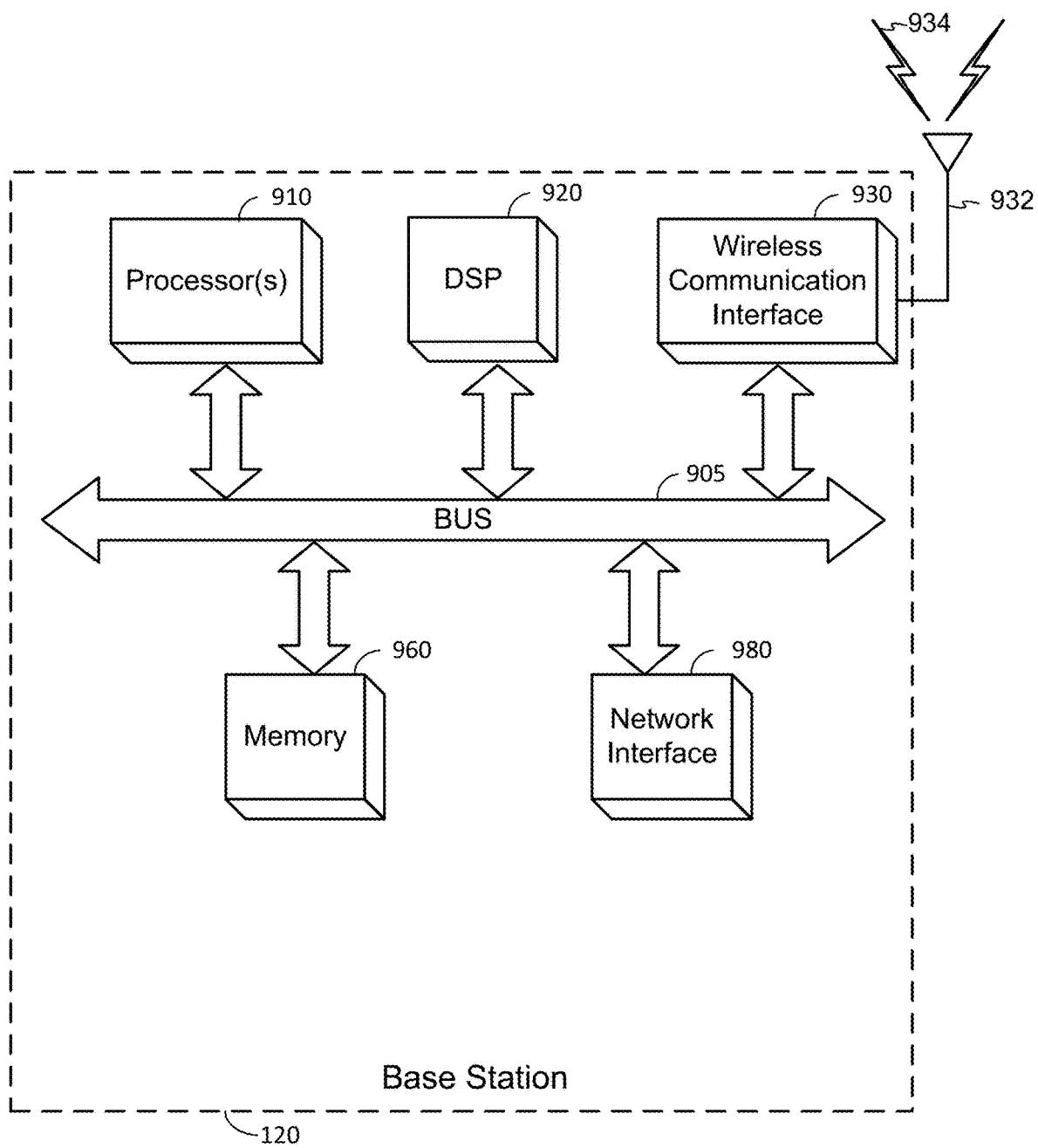
FIG. 9 illustrates an embodiment of a base station, which can be utilized in embodiments as described herein.

FIG. 9 illustrates an embodiment of a base station 120, which can be utilized as described herein above (e.g., in association with FIGS. 1-8). It should be noted that FIG. 9 is meant only to provide a generalized illustration of various components, any or all of which may be utilized as appropriate. In some embodiments, the base station 120 may correspond to a gNB, an ng-eNB, and/or (more generally) a TRP.

The base station 120 is shown comprising hardware elements that can be electrically coupled via a bus 905 (or may otherwise be in communication, as appropriate). The hardware elements may include a processor(s) 910 which can include without limitation one or more general-purpose processors, one or more special-purpose processors (such as DSP chips, graphics acceleration processors, ASICs, and/or the like), and/or other processing structure or means. As shown in FIG. 9, some embodiments may have a separate DSP 920, depending on desired functionality. Location determination and/or other determinations based on wireless communication may be provided in the processor(s) 910 and/or wireless communication interface 930 (discussed below), according to some embodiments. The base station 120 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 120 might also include a wireless communication interface 930, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 120 to communicate as described herein. The wireless communication interface 930 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 932 that send and/or receive wireless signals 934.

The base station 120 may also include a network interface 980, which can include support of wireline communication technologies. The network interface 980 may include a modem, network card, chipset, and/or the like. The network interface 980 may include one or more input and/or output communication interfaces to permit data to be exchanged with a network, communication network servers, computer systems, and/or any other electronic devices described herein.

In many embodiments, the base station 120 may further comprise a memory 960. The memory 960 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 960 of the base station 120 also may comprise software elements (not shown in FIG. 9), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 960 that are executable by the base station 120 (and/or processor(s) 910 or DSP 920 within base station 120). In some embodiments, then, such code and/or instructions can be used to configure and/or adapt a general-purpose computer (or other device) to perform one or more operations in accordance with the described methods.

Figure 10:
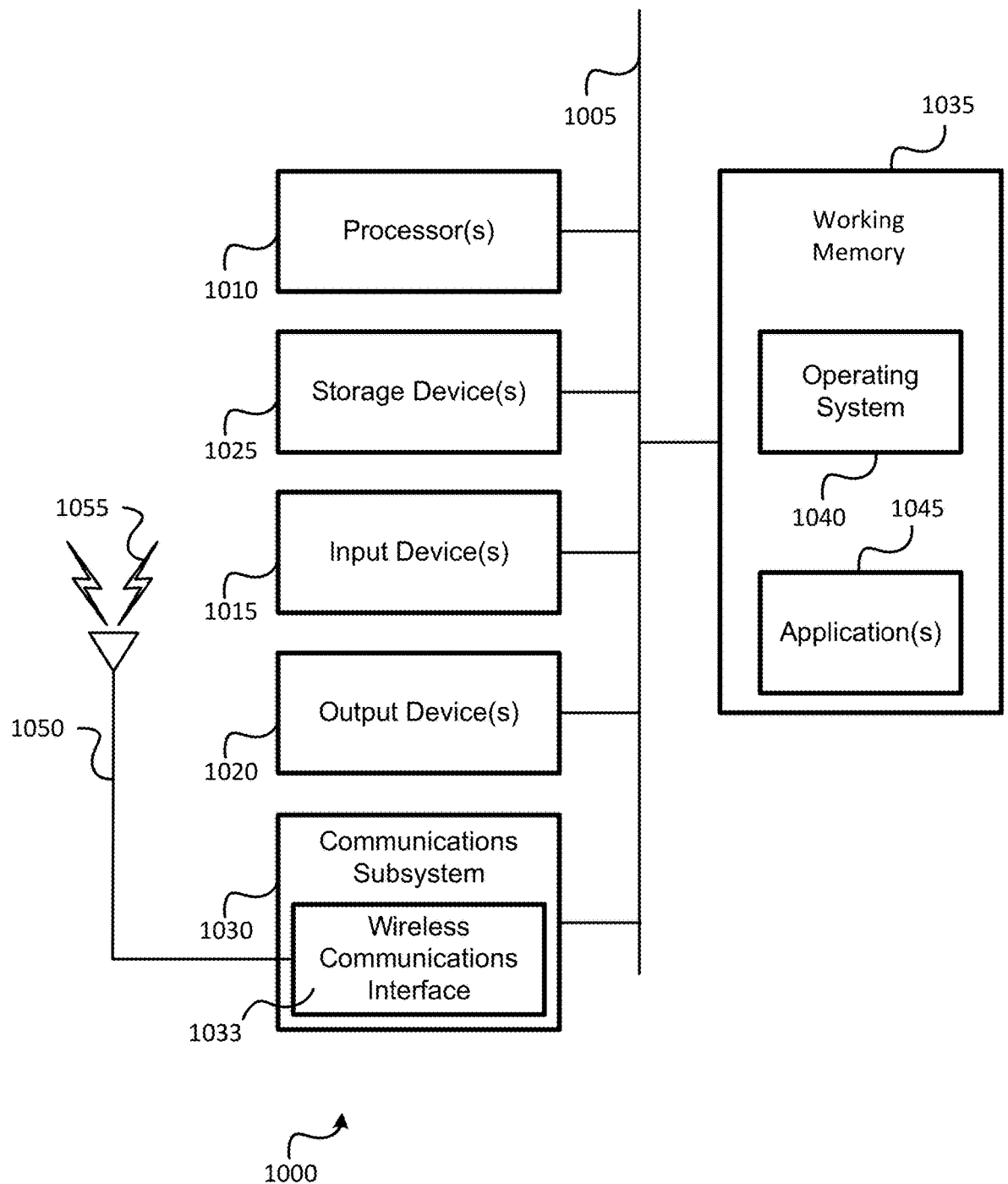
FIG. 10 is a block diagram of an embodiment of a computer system, which can be utilized in embodiments as described herein.

FIG. 10 is a block diagram of an embodiment of a computer system 1000, which may be used, in whole or in part, to provide the functions of one or more network components as described in the embodiments herein (e.g., location server 160 of FIG. 1 or LMF 220 of FIGS. 2 and 6). It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner. In addition, it can be noted that components illustrated by FIG. 10 can be localized to a single device and/or distributed among various networked devices, which may be disposed at different geographical locations.

The computer system 1000 is shown comprising hardware elements that can be electrically coupled via a bus 1005 (or may otherwise be in communication, as appropriate). The hardware elements may include processor(s) 1010, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1000 also may comprise one or more input devices 1015, which may comprise without limitation a mouse, a keyboard, a camera, a microphone, and/or the like; and one or more output devices 1020, which may comprise without limitation a display device, a printer, and/or the like.

The computer system 1000 may further include (and/or be in communication with) one or more non-transitory storage devices 1025, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1000 may also include a communications subsystem 1030, which may comprise wireless communication technologies managed and controlled by a wireless communication interface 1033, as well as wired technologies (such as Ethernet, coaxial communications, universal serial bus (USB), and the like). The wireless communication interface 1033 may comprise one or more wireless transceivers may send and receive wireless signals 1055 (e.g., signals according to 5G NR or LTE) via wireless antenna(s) 1050. Thus the communications subsystem 1030 may comprise a modem, a network card (wireless or wired), an infrared communication device, a wireless communication device, and/or a chipset, and/or the like, which may enable the computer system 1000 to communicate on any or all of the communication networks described herein to any device on the respective network, including a User Equipment (UE), base stations and/or other TRPs, and/or any other electronic devices described herein. Hence, the communications subsystem 1030 may be used to receive and send data as described in the embodiments herein.

In many embodiments, the computer system 1000 will further comprise a working memory 1035, which may comprise a RAM or ROM device, as described above. Software elements, shown as being located within the working memory 1035, may comprise an operating system 1040, device drivers, executable libraries, and/or other code, such as one or more applications 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1025 described above. In some cases, the storage medium might be incorporated within a computer system, such as computer system 1000. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description, embodiments may include different combinations of features. Implementation examples are described in the following numbered clauses:

Clause 1. A method of providing a positioning measurement report for determining a location of a first user equipment (UE), the method comprising: obtaining a first measurement, with the first UE, of a first reference signal sent via a sidelink (SL) interface between the first UE and a second UE; obtaining a second measurement, with the first UE, of a second reference signal transmitted by a base station, wherein the first measurement and the second measurement are obtained within a predetermined time window; and sending, with the first UE, information indicative of the first measurement and information indicative of the second measurement.

Clause 2. The method of clause 1, wherein the information indicative of the first measurement comprises information indicative of a Reference Signal Time Difference (RSTD) based on the first measurement of the first reference signal and the second measurement of the second reference signal.

Clause 3. The method of clause 2 wherein the first UE determines the RSTD at least in part by using the base station as a reference node for the RSTD determination.

Clause 4. The method of clause 2 wherein the first UE receives an indication that the second UE meets an accuracy threshold, and, responsive to the indication that the second UE meets the accuracy threshold, the first UE uses the second UE as a reference node in determining the RSTD.

Clause 5. The method of any of clauses 1-4 wherein the information indicative of the first measurement comprises information indicative of a Round Trip Time (RTT) based on the first measurement of the first reference signal.

Clause 6. The method of clause 5 wherein obtaining the first measurement comprises determining a first Rx-Tx measurement based on the first reference signal, wherein: the first UE further receives a second Rx-Tx measurement, taken by the second UE, via the SL interface; and sending the information indicative of the RTT based on the first measurement of the first reference signal comprises sending: the first Rx-Tx measurement and the second Rx-Tx measurement, or the RTT determined from the first Rx-Tx measurement and the second Rx-Tx measurement, or any combination thereof.

Clause 7. The method of any of clauses 1-6 wherein the information indicative of the first measurement comprises an indication of an Angle of Departure (AoD) based on the first measurement of the first reference signal.

Clause 8. The method of clause 7 wherein the indication of the AoD based on the first measurement of the first reference signal comprises a Reference Signal Receive Power (RSRP) measurement and beam ID of the first reference signal.

Clause 9. The method of any of clauses 1-8 wherein the information indicative of the first measurement comprises an indication of an Angle of Arrival (AoA) based on the first measurement of the first reference signal.

Clause 10. The method of clause 9 wherein the indication of the AoA based on the first measurement of the first reference signal comprises an orientation and receiving beam or angle of the first UE.

Clause 11. The method of any of clauses 1-10 wherein sending the information indicative of the first measurement and information indicative of the second measurement comprises sending the information to a location server.

Clause 12. The method of any of clauses 1-11 wherein the predetermined time window comprises a time window defined by: a number of Orthogonal Frequency Division Multiplexing (OFDM) slots, a number OFDM subframes, a number OFDM frames, a start time and an end time, a time duration, a number of measurement gaps (MGs), or a number of processing windows, or a combination thereof.

Clause 13. The method of any of clauses 1-12 further comprising, prior to obtaining the first measurement and the second measurement, receiving information indicative of the predetermined time window with the first UE.

Clause 14. A first user equipment (UE) for providing a positioning measurement report for determining a location of the first UE, the first UE comprising: a transceiver; a memory; and one or more processors communicatively coupled with the transceiver and the memory, wherein the one or more processors are configured to: obtain a first measurement, using the transceiver, of a first reference signal sent via a sidelink (SL) interface between the first UE and a second UE; obtain a second measurement, using the transceiver, of a second reference signal transmitted by a base station, wherein the first measurement and the second measurement are obtained within a predetermined time window; and send, using the transceiver, information indicative of the first measurement and information indicative of the second measurement.

Clause 15. The first UE of clause 14, wherein the one or more processors are configured to include, in the information indicative of the first measurement, information indicative of a Reference Signal Time Difference (RSTD) based on the first measurement of the first reference signal and the second measurement of the second reference signal.

Clause 16. The first UE of clause 15 wherein the one or more processors are configured to determine the RSTD at least in part by using the base station as a reference node for the RSTD determination.

Clause 17. The first UE of clause 15 wherein the one or more processors are further configured to: receive an indication that the second UE meets an accuracy threshold; and, responsive to receiving the indication that the second UE meets the accuracy threshold, use the second UE as a reference node to determine the RSTD.

Clause 18. The first UE of any of clauses 14-17 wherein the one or more processors are configured to include, in the information indicative of the first measurement, information indicative of a Round Trip Time (RTT) based on the first measurement of the first reference signal.

Clause 19. The first UE of clause 18 wherein to obtain the first measurement, the one or more processors are configured to determine a first Rx-Tx measurement based on the first reference signal, wherein: the one or more processors are configured to receive a second Rx-Tx measurement, taken by the second UE, via the SL interface; and the one or more processors are configured to send the information indicative of the RTT based on the first measurement of the first reference signal, wherein the one or more processors are configured to include, in the information indicative of the RTT: the first Rx-Tx measurement and the second Rx-Tx measurement, or the RTT determined from the first Rx-Tx measurement and the second Rx-Tx measurement, or any combination thereof.

Clause 20. The first UE of any of clauses 14-19 wherein the one or more processors are configured to include, in the information indicative of the first measurement, an indication of an Angle of Departure (AoD) based on the first measurement of the first reference signal.

Clause 21. The first UE of clause 20 wherein the one or more processors are configured to include, in the indication of the AoD based on the first measurement of the first reference signal, a Reference Signal Receive Power (RSRP) measurement and beam ID of the first reference signal.

Clause 22. The first UE of any of clauses 14-21 wherein the one or more processors are configured to include, in the information indicative of the first measurement, an indication of an Angle of Arrival (AoA) based on the first measurement of the first reference signal.

Clause 23. The first UE of clause 22 wherein the one or more processors are configured to include, in the indication of the AoA based on the first measurement of the first reference signal, an orientation and receiving beam or angle of the first UE.

Clause 24. The first UE of any of clauses 14-23 wherein, to send the information indicative of the first measurement and information indicative of the second measurement, the one or more processors are configured to send the information to a location server.

Clause 25. The first UE of any of clauses 14-24 wherein the predetermined time window comprises a time window defined by: a number of Orthogonal Frequency Division Multiplexing (OFDM) slots, a number OFDM subframes, a number OFDM frames, a start time and an end time, a time duration, a number of measurement gaps (MGs), or a number of processing windows, or a combination thereof.

Clause 26. The first UE of any of clauses 14-25 wherein the one or more processors are further configured to, prior to obtaining the first measurement and the second measurement, receive information indicative of the predetermined time window via the transceiver.

Clause 27. An apparatus for providing a positioning measurement report for determining a location of a first user equipment (UE), the apparatus comprising means for obtaining the method of any one of clauses 1-14.

Clause 28. A non-transitory computer-readable medium storing instructions for providing a positioning measurement report for determining a location of a first user equipment (UE), the instructions comprising code for obtaining the method of any one of clauses 1-14.

What is claimed is:

1. A method of providing a positioning measurement report for determining a location of a first user equipment (UE), the method comprising:
  receiving, by the first UE, a configuration indicative of a predetermined time window comprising a period of time during which a first measurement and a second measurement are to be obtained;
  determining, by the first UE, one of:
    a) to use a base station as a reference node, wherein determining to use the base station as the reference node is based on receiving a first indication from a location server that a second UE should not be used as the reference node; or
    b) to use the second UE as the reference node, wherein determining to use the second UE as the reference node is based on receiving a second indication from one of the second UE, the base station, or the location server, that the second UE meets an accuracy threshold;
  obtaining the first measurement, by the first UE, of a first reference signal transmitted by the reference node;
  obtaining the second measurement, by the first UE, of a second reference signal transmitted by the other one of the base station or the second UE that is not the reference node, wherein the first measurement and the second measurement are obtained within the predetermined time window; and
  sending, by the first UE, information indicative of the first measurement and information indicative of the second measurement.

2. The method of claim 1, wherein the second UE is configured to communicate with the first UE via a sidelink (SL) interface, and wherein the information indicative of the first measurement comprises information indicative of a Reference Signal Time Difference (RSTD) based on the first measurement of the first reference signal and the second measurement of the second reference signal.

3. The method of claim 2, wherein the first UE determines the RSTD at least in part by using the base station as the reference node for the RSTD determination.

4. The method of claim 1, wherein the information indicative of the first measurement comprises information indicative of a Round Trip Time (RTT) based on the first measurement of the first reference signal.

5. The method of claim 4, wherein obtaining the first measurement comprises determining a first Rx-Tx measurement based on the first reference signal, wherein:
  the first UE further receives a second Rx-Tx measurement, taken by the second UE, via a sidelink (SL) interface; and
  sending the information indicative of the RTT based on the first measurement of the first reference signal comprises sending:
    the first Rx-Tx measurement and the second Rx-Tx measurement, or
    the RTT determined from the first Rx-Tx measurement and the second Rx-Tx measurement, or
    any combination thereof.

6. The method of claim 1, wherein the information indicative of the first measurement comprises an indication of an Angle of Departure (AoD) based on the first measurement of the first reference signal.

7. The method of claim 6, wherein the indication of the AoD based on the first measurement of the first reference signal comprises a Reference Signal Receive Power (RSRP) measurement and beam ID of the first reference signal.

8. The method of claim 1, wherein the information indicative of the first measurement comprises an indication of an Angle of Arrival (AoA) based on the first measurement of the first reference signal.

9. The method of claim 8, wherein the indication of the AoA based on the first measurement of the first reference signal comprises an orientation and receiving beam or angle of the first UE.

10. The method of claim 1, wherein sending the information indicative of the first measurement and the information indicative of the second measurement comprises sending the information to the location server.

11. The method of claim 1, wherein the predetermined time window comprises a time window defined by:
  a number of Orthogonal Frequency Division Multiplexing (OFDM) slots,
  a number OFDM subframes,
  a number OFDM frames,
  a start time and an end time,
  a time duration,
  a number of measurement gaps (MGs), or
  a number of processing windows, or
  a combination thereof.

12. The method of claim 1, further comprising, prior to obtaining the first measurement and the second measurement, receiving information indicative of the predetermined time window by the first UE.

13. A first user equipment (UE) for providing a positioning measurement report for determining a location of the first UE, the first UE comprising:
  a transceiver;
  a memory; and
  one or more processors communicatively coupled with the transceiver and the memory, wherein the one or more processors are configured to:
  receive a configuration indicative of a predetermined time window comprising a period of time during which a first measurement and a second measurement are to be obtained;
  determine one of:
    a) to use a base station as a reference node, wherein determining to use the base station as the reference node is based on receiving a first indication from a location server that a second UE should not be used as the reference node; or b) to use the second UE as the reference node, wherein determining to use the second UE as the reference node is based on receiving a second indication from one of the second UE, the base station, or the location server, that the second UE meets an accuracy threshold;

obtain the first measurement, using the transceiver, of a first reference signal transmitted by the reference node;

obtain the second measurement, using the transceiver, of a second reference signal transmitted by the other one of the base station or the second UE that is not the reference node, wherein the first measurement and the second measurement are obtained within the predetermined time window; and send, using the transceiver, information indicative of the first measurement and information indicative of the second measurement.

14. The first UE of claim 13, wherein the second UE is configured to communicate with the first UE via a sidelink (SL) interface, and wherein the one or more processors are configured to include, in the information indicative of the first measurement, information indicative of a Reference Signal Time Difference (RSTD) based on the first measurement of the first reference signal and the second measurement of the second reference signal.

15. The first UE of claim 14, wherein the one or more processors are configured to determine the RSTD at least in part by using the base station as the reference node for the RSTD determination.

16. The first UE of claim 14, wherein the one or more processors are further configured to:
receive an indication that the second UE meets an accuracy threshold; and,
responsive to receiving the indication that the second UE meets the accuracy threshold, use the second UE as the reference node to determine the RSTD.

17. The first UE of claim 13, wherein the one or more processors are configured to include, in the information indicative of the first measurement, information indicative of a Round Trip Time (RTT) based on the first measurement of the first reference signal.

18. The first UE of claim 17, wherein to obtain the first measurement, the one or more processors are configured to determine a first Rx-Tx measurement based on the first reference signal, wherein:
the one or more processors are configured to receive a second Rx-Tx measurement, taken by the second UE, via a sidelink (SL) interface; and
the one or more processors are configured to send the information indicative of the RTT based on the first measurement of the first reference signal, wherein the one or more processors are configured to include, in the information indicative of the RTT:
the first Rx-Tx measurement and the second Rx-Tx measurement, or
the RTT determined from the first Rx-Tx measurement and the second Rx-Tx measurement, or
any combination thereof.

19. The first UE of claim 13, wherein the one or more processors are configured to include, in the information indicative of the first measurement, an indication of an Angle of Departure (AoD) based on the first measurement of the first reference signal.

20. The first UE of claim 19, wherein the one or more processors are configured to include, in the indication of the AoD based on the first measurement of the first reference signal, a Reference Signal Receive Power (RSRP) measurement and beam ID of the first reference signal.

21. The first UE of claim 13, wherein the one or more processors are configured to include, in the information indicative of the first measurement, an indication of an Angle of Arrival (AoA) based on the first measurement of the first reference signal.

22. The first UE of claim 21, wherein the one or more processors are configured to include, in the indication of the AoA based on the first measurement of the first reference signal, an orientation and receiving beam or angle of the first UE.

23. The first UE of claim 13, wherein, to send the information indicative of the first measurement and the information indicative of the second measurement, the one or more processors are configured to send the information to a location server.

24. The first UE of claim 13, wherein the predetermined time window comprises a time window defined by:
a number of Orthogonal Frequency Division Multiplexing (OFDM) slots,
a number OFDM subframes,
a number OFDM frames,
a start time and an end time,
a time duration,
a number of measurement gaps (MGs), or
a number of processing windows, or
a combination thereof.

25. The first UE of claim 13, wherein the one or more processors are further configured to, prior to obtaining the first measurement and the second measurement, receive information indicative of the predetermined time window via the transceiver.

26. An apparatus for providing a positioning measurement report for determining a location of a first user equipment (UE), the apparatus comprising:
means for receiving a configuration indicative of a predetermined time window comprising a period of time during which a first measurement and a second measurement are to be obtained;
means for determining one of:
a) to use a base station as a reference node, wherein determining to use the base station as the reference node is based on receiving a first indication from a location server that a second UE should not be used as the reference node; or
b) to use the second UE as the reference node, wherein determining to use the second UE as the reference node is based on receiving a second indication from one of the second UE, the base station, or the location server, that the second UE meets an accuracy threshold;
means for obtaining the first measurement, at the first UE, of a first reference signal transmitted by the reference node;
means for obtaining the second measurement, at the first UE, of a second reference signal transmitted by the other one of the base station or the second UE that is not the reference node, wherein the first measurement and the second measurement are obtained within the predetermined time window; and
means for sending information indicative of the first measurement and information indicative of the second measurement.

27. The apparatus of claim 26, wherein the second UE is configured to communicate with the first UE via a sidelink (SL) interface, and wherein the means for sending information indicative of the first measurement comprise means for sending information indicative of a Reference Signal Time Difference (RSTD) based on the first measurement of the first reference signal and the second measurement of the second reference signal.

28. The apparatus of claim 26, wherein the means for sending information indicative of the first measurement comprise means for sending an indication of a Round Trip Time (RTT) based on the first measurement of the first reference signal.

29. A non-transitory computer-readable medium storing instructions for providing a positioning measurement report for determining a location of a first user equipment (UE), the instructions comprising code for:

receiving a configuration indicative of a predetermined time window comprising a period of time during which a first measurement and a second measurement are to be obtained;

determining one of:

a) to use a base station as a reference node, wherein determining to use the base station as the reference node is based on receiving a first indication from a location server that a second UE should not be used as the reference node; or b) to use the second UE as the reference node, wherein determining to use the second UE as the reference node is based on receiving a second indication from one of the second UE, the base station, or the location server, that the second UE meets an accuracy threshold;

obtaining the first measurement, by the first UE, of a first reference signal transmitted by the reference node;

obtaining the second measurement, by the first UE, of a second reference signal transmitted by the other one of the base station or the second UE that is not the reference node, wherein the first measurement and the second measurement are obtained within the predetermined time window; and sending, by the first UE, information indicative of the first measurement and information indicative of the second measurement.

\* \* \* \* \*